United States Patent [19]

Boggs

[11] 4,050,798
[45] Sept. 27, 1977

[54] VISUALIZER

[76] Inventor: William O. Boggs, 1333 N. Robberson, Springfield, Mo. 65802

[21] Appl. No.: 642,019

[22] Filed: Dec. 18, 1975

[51] Int. Cl.² .......................................... G03B 21/26
[52] U.S. Cl. ...................................................... 353/35
[58] Field of Search ................. 353/35; 242/201, 56.9, 242/71.6

[56] References Cited

U.S. PATENT DOCUMENTS

| | | | |
|---|---|---|---|
| 1,704,814 | 3/1929 | Wellman | 353/95 |
| 1,965,875 | 7/1934 | Behymer | 353/35 |
| 2,813,457 | 11/1957 | Fitzgerald | 353/35 |
| 3,336,681 | 8/1967 | Minasy | 353/35 |
| 3,687,536 | 8/1972 | Gorrell et al. | 353/35 |

Primary Examiner—Steven L. Stephan
Attorney, Agent, or Firm—Gravely, Lieder & Woodruff

[57] ABSTRACT

A visualizer apparatus for composing composite illustrations has a housing with a viewing tunnel and a lamp house therein and a film gate between the tunnel and lamp house. A plurality of film strips having illustrations thereon pass through the film gate where they are superimposed on each other to form a composite illustration which is visible through the tunnel. Beyond both ends of the film gate, these film strips are wound around spools which are also within the housing. Each spool has a spool pulley which normally rotates freely relative to it, and all of the spool pulleys are connected to an electric drive motor by a series of belts. The spools are individually engageable with their spool pulleys so that the film strips may be advanced one at a time in either direction to vary the composite illustration formed in the gate. The lamp house and viewing tunnel slide out of the housing, as does a lamp assembly which is in the lamp house.

26 Claims, 18 Drawing Figures

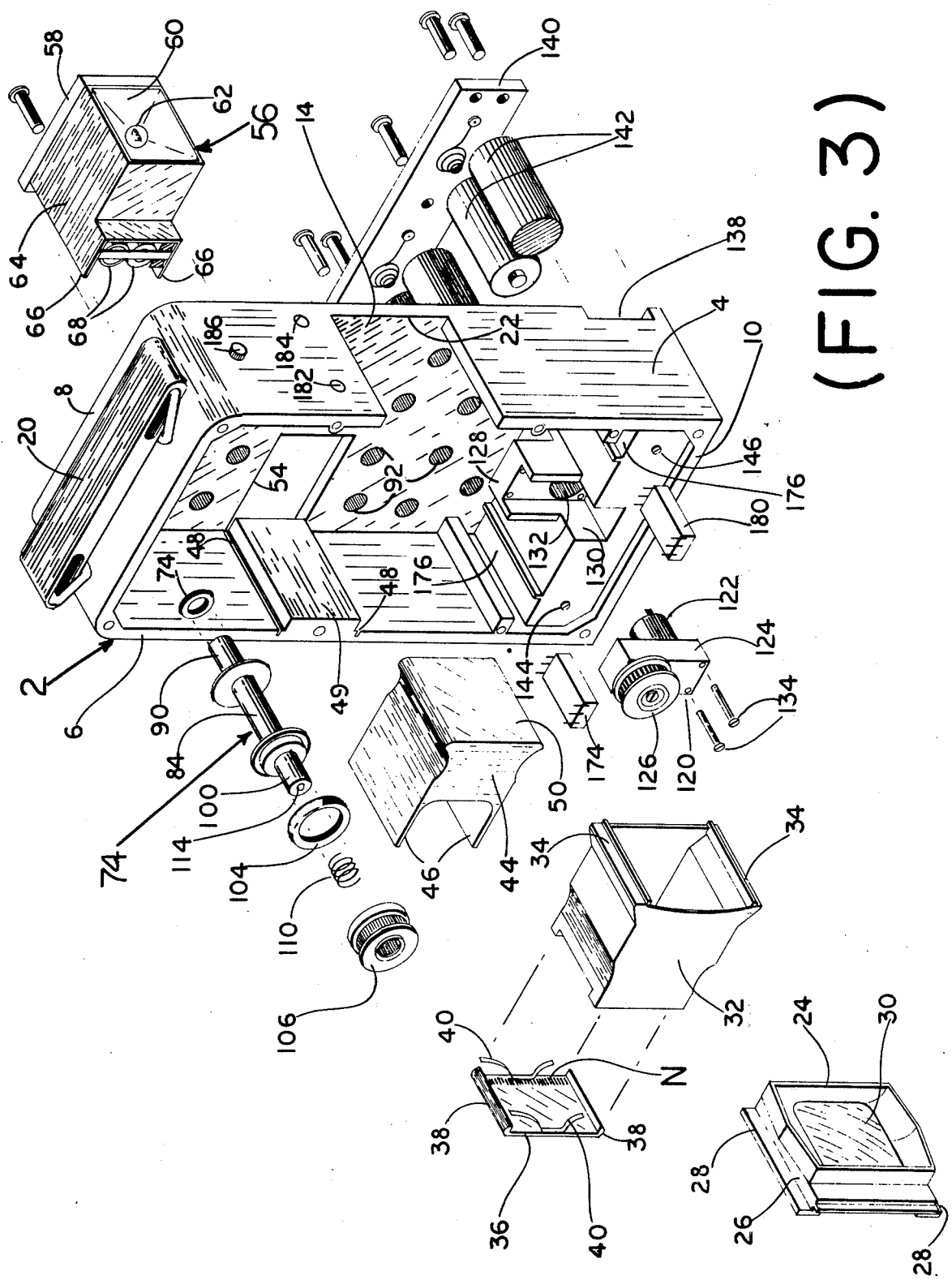
(FIG. 3)

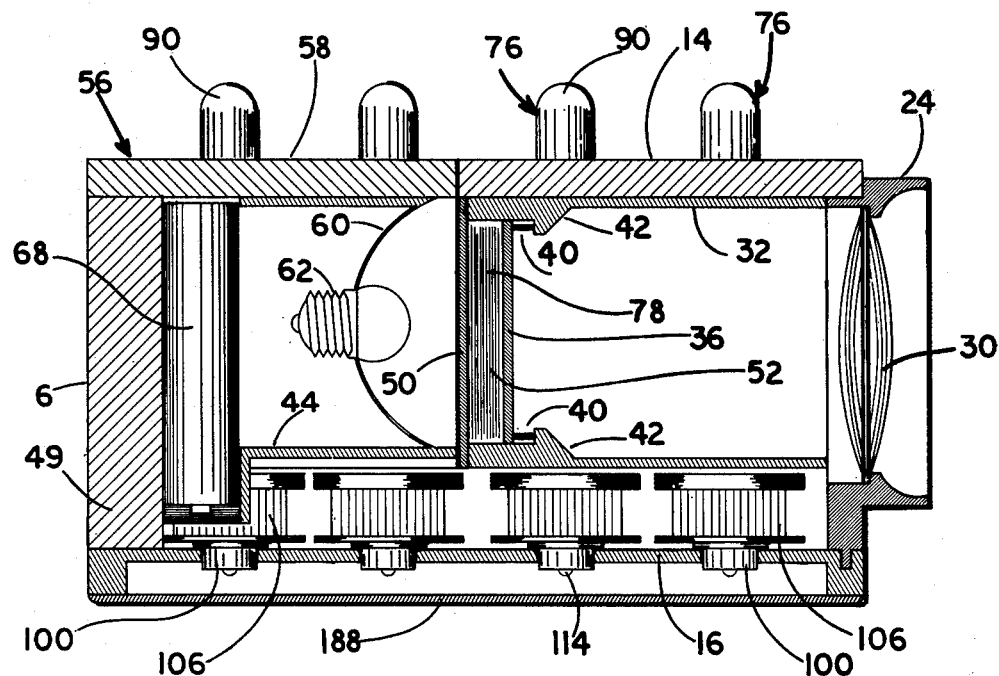
(FIG. 4)
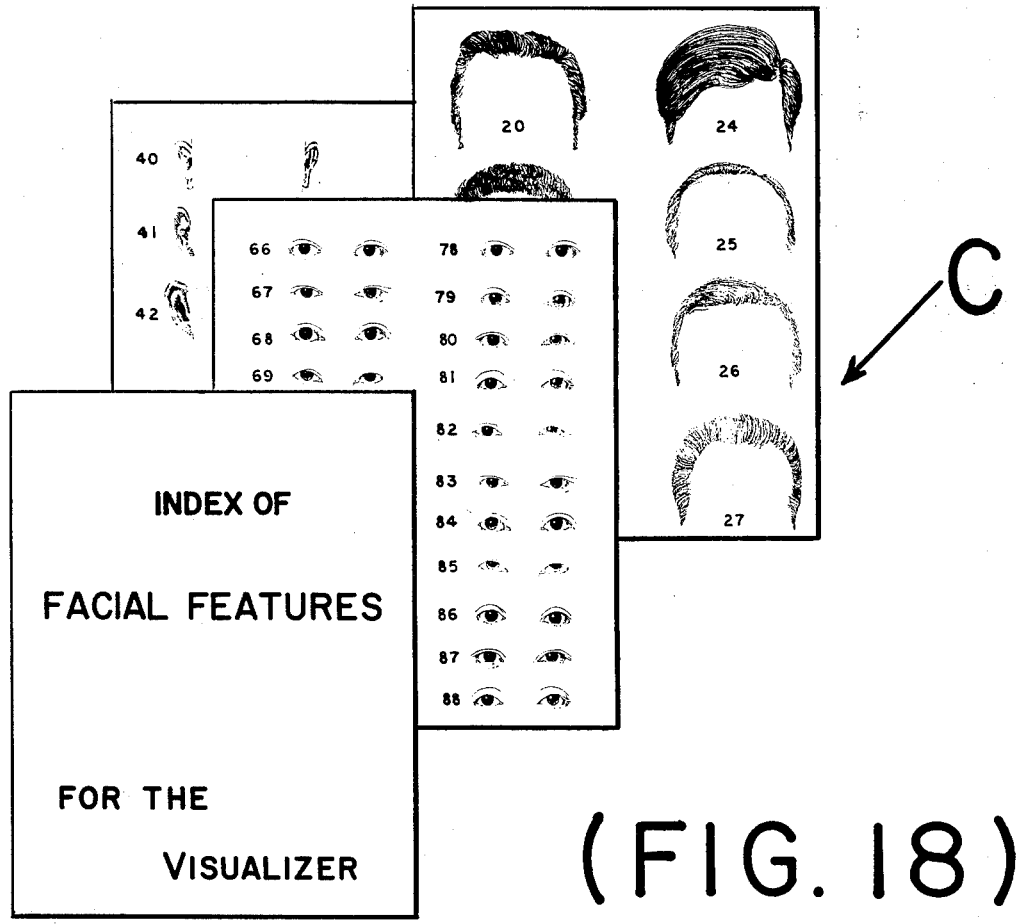
(FIG. 18)

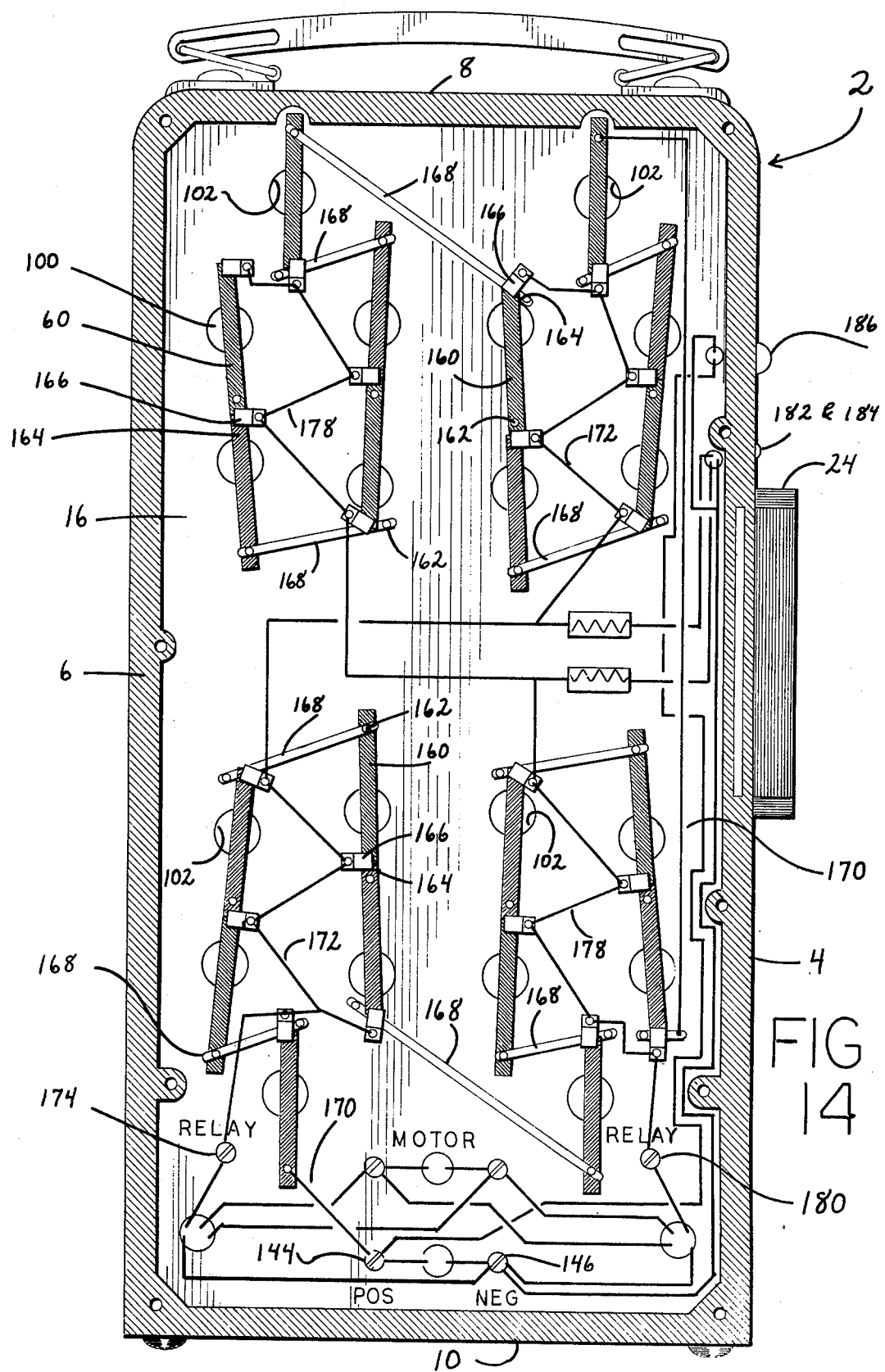

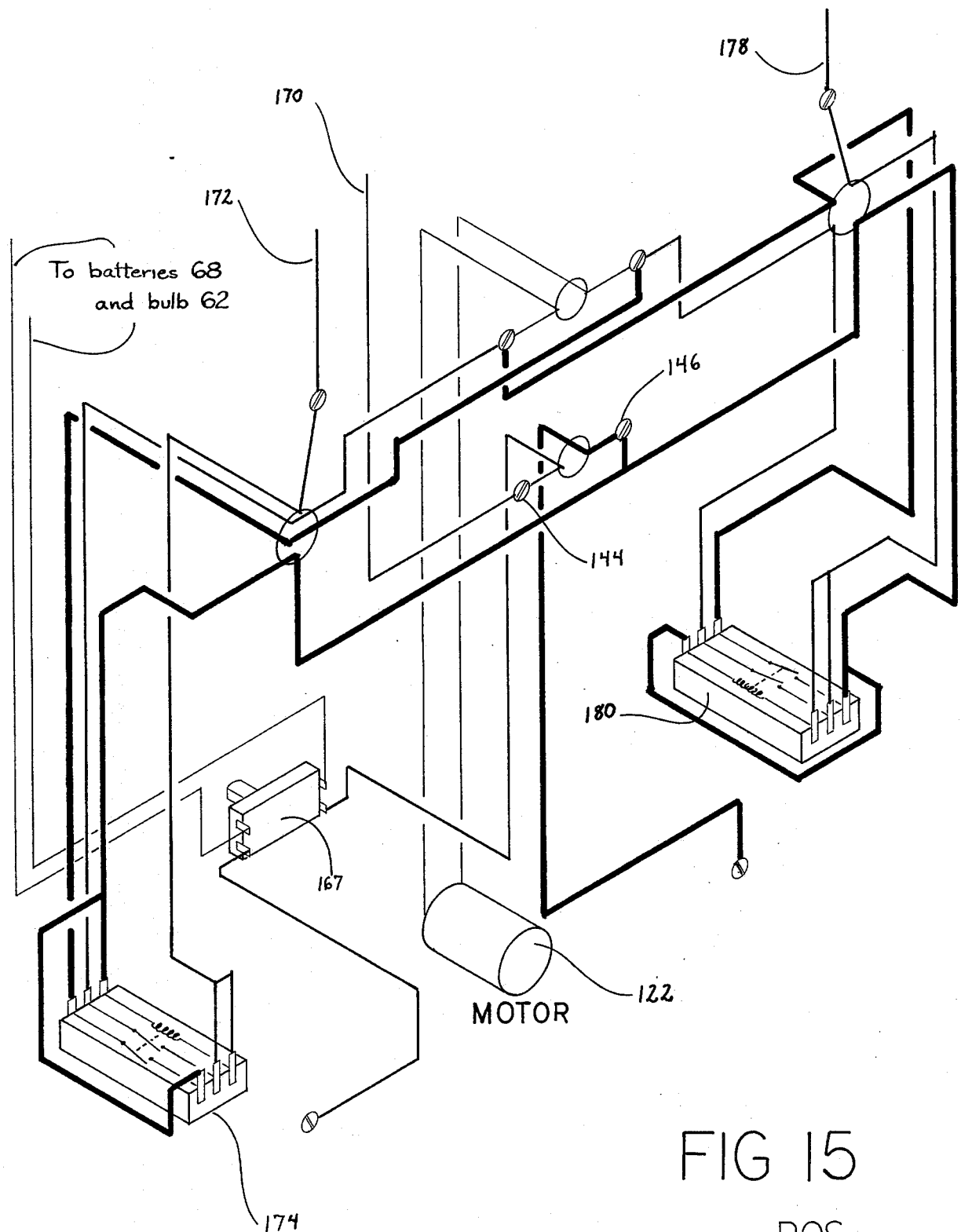

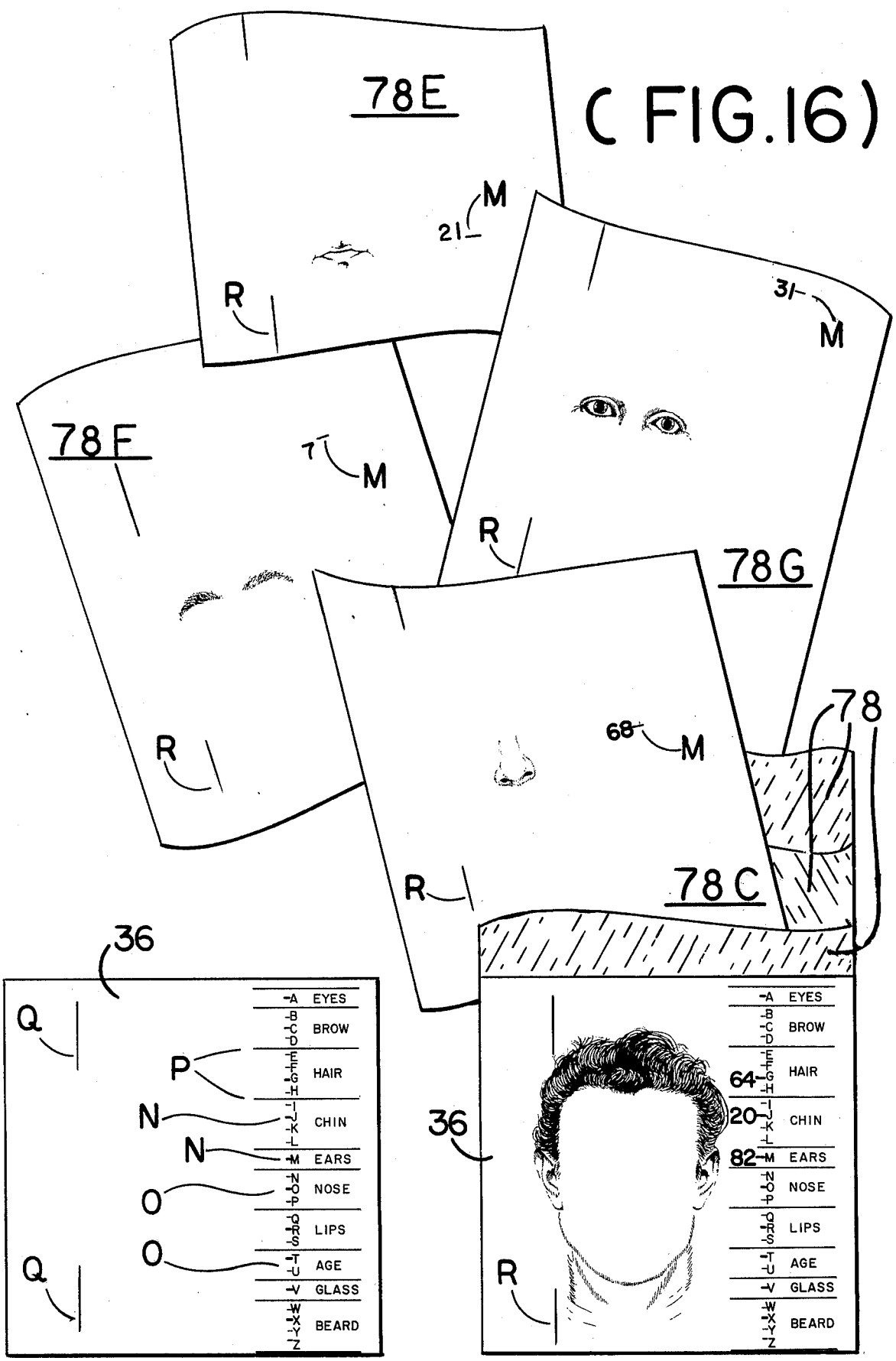

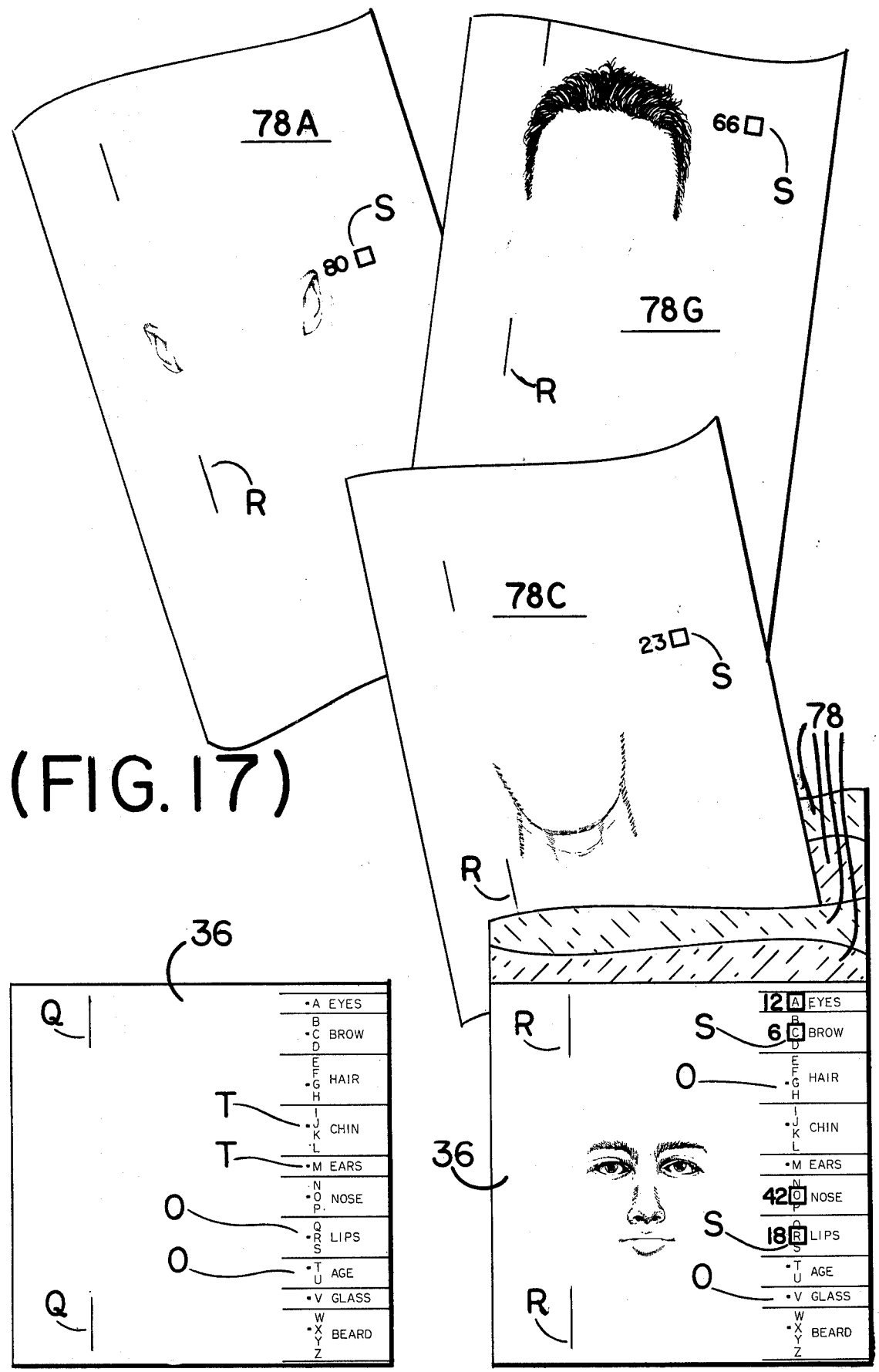
(FIG. 17)

VISUALIZER

BACKGROUND OF THE INVENTION

This invention relates in general to visualizers and more particularly to a visualizer for composing composite illustrations.

Commposite illustrations have proved quite useful in such widely divergent fields as law enforcement, architecture, construction, and education, but perhaps the most familiar use is the construction of portraits by police agencies to apprehend criminal suspects. Heretofore, the procedure for constructing such composites has involved a series of individual overlays. For example, the overlay kit has numerous overlays for each of various facial features such as head shape, eyes, nose, hair, etc. The witness to a crime selects the overlays for each feature which he feels best match the corresponding features of the criminal he observed. When these ovelays are placed together, the resulting composite portrait should resemble the criminal suspect, but often it does not and the overlays must be changed. Handling and changing the overlays is a clumsy and time-consuming procedure. Futhermore, once a suitable composite portrait is obtained, the only practical method of disseminating it to other law enforcement personnel is to photograph the portrait and thereafter have it reproduced in multiple copies. This too is time-consuming and can also be quite expensive.

SUMMARY OF THE INVENTION

One of the principle objects of the present invention is to provide a visualizer apparatus for rapidly constructing composite illustrations. Another object is to provide an apparatus of the type stated which is highly compact. An additional object is to provide an apparatus of the type stated in which illustrations used to compose the composite illustrations are film strips and the film strips are advanced individualy in either direction by an electric drive mechanism. A further object is to provide an apparatus of the type stated which enables any composite illustration which is produced to be rapidly disseminated and reconstructed by others having similar visualizer apparatus. These and other objects and advantages will become apparent hereinafter.

The present invention is embodied in a visualized apparatus includng a housing, a film gate in the housing, and means for illuminating one side of the film gate. Film strips extend through the gate where they are superimposed to form a composite illustration. The housing also contains an electric motor and means coupling that motor with the film strips for moving each film strip individually through the gate to change the composition of the composite illustration. The invention is further embodied in a visualizer apparatus in which the housing has a removable sidewall and the gate is located between a viewing tunnel and a lamp house, it being defined by a pressure shoe on the former and an end plate on the latter. The pressure shoe is spring loaded. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur;

FIG. 3 is an exploded perspective view of the left side of the visualizer;

FIG. 4 is a sectional view taken along line 4—4 of FIG. 2 and showing the viewing tunnel and lamp house;

FIG. 14 is a sectional view showing the electrical contacts and contactors on the removable sidewall;

FIG. 15 is an electrical schematic in perspective and showing the relays which energize the motor, the equivalent circuits of the relays being shown thereon;

FIG. 16 is a composite view showing the films used to compose the composite portrait and the registration marks on those films.

FIG. 17 is a composite view similar to FIG. 16 but showing a different type of registration mark; and FIG. 18 is a view of the index cards used to identify the various facial features.

DETAILED DESCRIPTION

Figure 1:
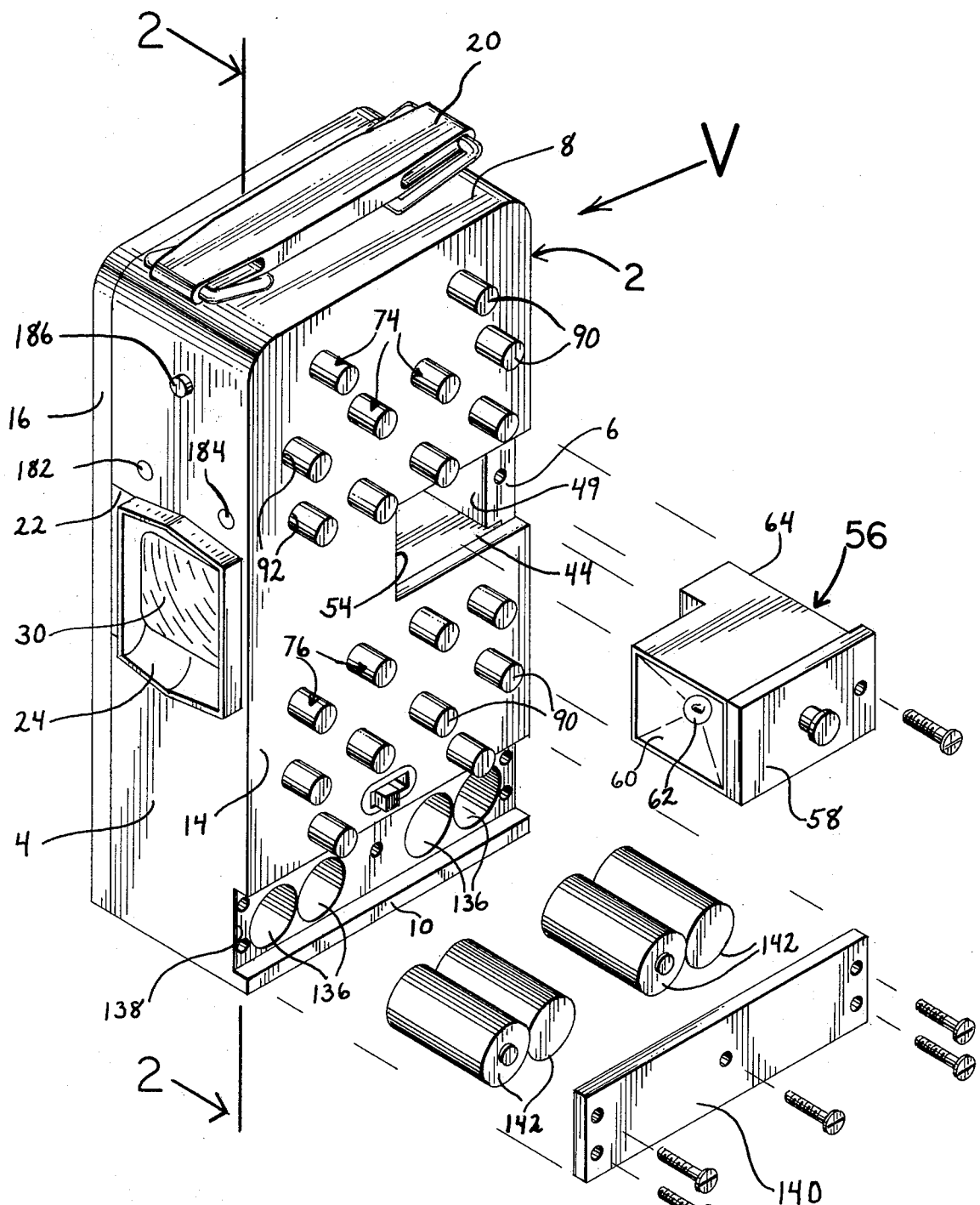
FIG. 1 is an exploded perspective view showing the right side of the visualizer of the present invention.

Referring now to the drawings (FIG. 1), V designates a visualizer for composing composite illustrations. While the illustrations may be of almost anything, the present discussion will be confined primarily to the construction of composite portraits of the type often used by law enforcement agencies for apprehending criminal suspects. The visualizer V is rectangular in configuration and is highly compact, measuring approximately 2 15/16 inches × 5 ¼ inches × 10¼ inches. It is also light in weight and completely portable. The visualizer V includes a housing 2 having a front wall 4, a back wall 6, a top wall 8, and a bottom wall 10 which are joined together at their ends to form a generally rectangular interior within the housing 2. The bottom wall 10 is considerably thicker than the other walls 4, 6 and 8. One side of the hollow interior is closed by a sidewall 14 which is formed integral with or it otherwise permanently attached to the walls 4, 6, 8 and 10. Preferably, the walls 4, 6, 8, 10 and 14 are molded as an integral unit from plastic. The other side of the hollow interior is closed by a sidewall 16 which is formed separate from the walls 4, 6, 8 and 10, but is attached to them by screws 18. The top wall 8 has a handle 20 attached to it to facilitate carrying the visualizer V.

The front wall 4 has a rectangular opening 22 (FIG. 3) located about midway between the top and bottom walls 8 and 10, and this opening extends the full distance between the two sidewalls 14 and 16. Indeed, the removable sidewall 16 forms one margin of the opening 22. Occupying the opening 22 is a viewing window frame 24 (FIGS. 2 and 3) having grooves 26 along its upper and lower edges, and these grooves are in part formed by L-shaped locking flanges 28 which are presented rearwardly on the frame 24 so as to face the interior of the housing 2. The grooves 26 receive the portions of the front wall 4 which border the opening 22 so that when the sidewall 16 is removed, the frame 24 may be installed on or removed from the front wall 4, merely by sliding it into or out of the opening 22. The viewing window frame 24 carries a lens 30.

Extended rearwardly from the viewing window frame 24 is a viewing tunnel 32 (FIGS. 2-4) having forwardly presented locating surfaces 34 which seat against the locking flanges 28 on the frame 24. When the surfaces 32 are so seated, the opticl axis of the lens 30 corresponds with the longitudinal axis of the tunnel 32. The tunnel 32 is rectangular in cross section and its one sidewall lies against the fixed sidewall 14 of the housing 2. The other sidewall of the tunnel 32 is spaced inwardly from the removable sidewall 16 of the housing 2. Near the rear end of the tunnel 32, its two sidewalls are extended slightly beyond its top and bottom walls (FIGS. 3 and 4). The rearwardly projecting sidewalls for the tunnel 32 form a guide for a pressure shoe 36 which fits between them and at its upper and lower ends has forwardly projecting lips 38 (FIG. 2) which extend over the top and bottom walls of the tunnel 32 to locate the shoe 36 in the vertical direction. The outwardly presented surface of each lip 38 is arcuate so that no sharp edges exist at the ends of the shoe 36. Attached to the shoe 36 adjacent to its side are relatively light leaf springs 40 (FIGS. 2 and 4) which project forwardly into the tunnel 32 and bear against vertical ribs 42 located on the sidewalls of the tunnel 32. The springs 40 urge the shoe 36 rearwardly. The pressure shoe 36 is made from a transparent material which is preferably a plastic.

The space between the viewing tunnel 32 and the back wall 6 of the housing 2 is occupied by lamp house 44 (FIGS. 2-4) having rearwardly projecting locating legs 46 which are received in slots 48 located in the back wall 6 along a rectangular projection 49 thereon. The slots 48 extend all the way to the removable sidewall 16, as does the projection 49, so that when the sidewall 16 is detached from the walls 4, 6, 8 and 10, the lamp house 44 may be withdrawn from the interior of the housing 2, much in the same manner that the viewing tunnel 32 and viewing window frame 24 are withdrawn (FIG. 3). When the sidewall 16 is in place, the lamp house 44 is clamped snugly between the sidewalls 14 and 16 and is retained in the vertical direction by the slots 48. At its forward end, the lamp house 44 is provided with a translucent end plate 50 which is located opposite to the pressure shoe 36 and the rearwardly extended portions of the two sidewalls on the viewing tunnel 32. Indeed, these portions of the viewing tunnel sidewalls bear against the end plate 50 and thereby prevent the lamp house 44 from moving forwardly. This not only maintains the legs 46 of the lamp house 44 engaged with the slots 48, but also keeps the locating surfaces of the viewing tunnel 32 in engagement with the L-shaped locking flanges 28 on the viewing window frame 24. The upper and lower edges of the end plate 50 are rounded or arcuate similar to the corresponding edges of the pressure shoe 36. The opposed pressure shoe 36 and end plate 50 form a vertical film gate 52 (FIGS. 2 and 4) within the interior of the housing 2.

That side of the lamp house 44 which is presented toward the fixed sidewall 14 is entirely open and is located opposite an opening 54 in the fixed sidewall 14 (FIG. 3). The opening 54 is smaller than the lamp house 44 to the extent that the fixed sidewall overlies the upper and lower edges of the lamp house 44, as well as the end plate 50 so that the lamp house 44 cannot be withdrawn from the housing 2 through the opening 54, yet access to the interior of the lamp house 44 is available through the opening 54.

The interior of the lamp house 44 contains a lamp assembly 56 (FIGS. 1-4) including a mounting plate 58 having a reflector 60 mounted thereon with its reflective surface presented forwardly toward the end plate 50. The lamp assembly 56 further includes a bulb 62 which is centered with respect to the reflector 60 in the usual manner. In addition, the lamp assembly 56 includes a battery holder 64 having rearwardly projecting guides 66 which fit on each side of the projection 49 on the back wall 6. The battery holder 64 contains a pair of batteries 68 and suitable contacts for placing the batteries 68 in series. Wires lead from the contacts of the battery holder 64 to the bulb 62. The entire lamp assembly 56 slides into the open side of the lamp house 44 through the opening 54 in the fixed sidewall 14. When the lamp assembly 56 is so disposed, the batteries 68 are adjacent to the projection 49, while the reflective surface of the reflector 60 is located immediately behind the translucent end plate 50 of the lamp house 44, so that when the bulb 62 is energized, it will illuminate the end plate 50. Moreover, the base plate 58 fully occupies the opening 54 when the lamp assembly 56 is in the lamp house 44 so that it is flush with the exterior surface of the fixed sidewall 14.

The viewing tunnel 32 and the lamp house 44 together divide the interior of the housing 2 into an upper spool cavity 70 (FIG. 2) and a lower spool cavity 72. The film gate 52 is positioned generally midway between the front wall 4 and back wall 6 with its upper end opening into the upper spool cavity 70 and its lower end opening into the lower spool cavity 72.

The upper spool cavity 70 contains 10 upper spool assemblies 74 a, b, c, d, e, f, g, h, i, j (FIG. 2), while the lower spool cavity 72 contains ten corresponding lower spool cavities 76 a, b, c, d, e, f, g, h, i, and j. Each corresponding set of spool assemblies 74 and 76 has a film strip 78 wound around its individual spool assemblies 74 and 76. The portion of the film strip 78 which is between the spool assemblies 74 and 76 passes through the film gate 52. For example, the film strip 78a is wound around the spool assemblies 74a and 76a and between those two spool assemblies it is extended through the gate 52. Likewise, the film strip 78b is wound around the spool assemblies 74b and 76b, and also passes through the gate 52. The 10 film strips 78a, b, c, d, e, f, g, h, i, j are superimposed on one another in that order within the gate 52, that is between the end plate 50 of the lamp house 44 and the pressure shoe 36 of the viewing tunnel 32. The spool assemblies 74 and 76 are arranged in their respective cavities 70 and 72 such that the 10 film strips 78 diverge beyond the ends of the gate 52 and do not interfere with each other. To achieve this end, the spool assemblies 74 *b, a, j, i* are located generally in a row immediately above the tunnel 32 and lamp house 44, while the spool assemblies 76 *b, a, j, i* are arranged in a similar row generally below the tunnel 32 and lamp house 44. The spool assemblies 74*c, e, f, h* are located in a row above the assemblies 74*b, a, j, i*, while the assemblies 76*c, e, f, h*, are located in a row below the assemblies 76*b, a, j, i.* The assemblies 74*d, g* are positioned adjacent to the top wall 8, while the assemblies 76*d, g*, are located below the assemblies 76*c, e, f, h*. Both the tunnel 32 and lamp house 44 are relieved adjacent to the gate 52 to accommodate the spool assemblies 74*a, j* and 76*a, j.*

Figure 9:
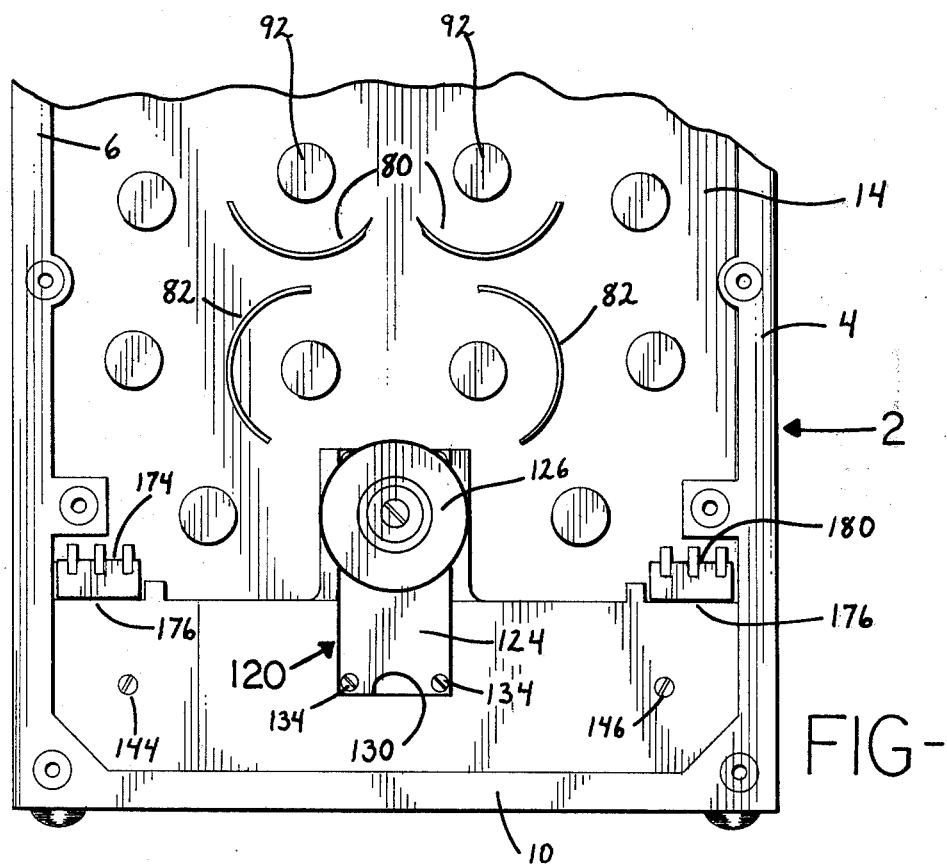
FIG. 9 is a fragmentary sectional view showing the inside of the housing with the spool assemblies removed therefrom.

Located on the opposite sides of the spool assemblies 74*a, j* and 76*a, j* are arcuate film guides 80 (FIGS. 2 and 9) which project into the cavities 70 and 72 from the fixed sidewall 14. The guides 80 at the spool assemblies 74*a* and 76*a* direct the film strips 78*b, c, d,* and *e* around those spool assemblies, while the guides 80 at the spool assemblies 74*j* and 76*j* direct the film strips 78*f, h* and *i* around those spool assemblies. The spool assemblies 74*e, f,* and 76*e, f,* also have arcuate guides 82 located adjacent to them, and these guides likewise project from the fixed sidewall 14. The guides 82 at the spool assemblies 74*e* and 76*e* direct the film strips 78*c* and *d* around those spool assemblies, while the guides 82 at the spool assemblies 74*f* and 76*f* direct the film strips 78*g* and *g* around those spool assemblies.

Figure 5:
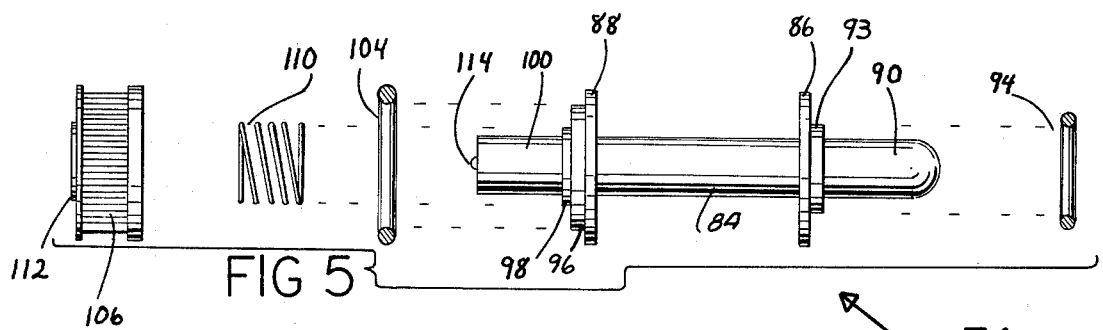
FIG. 5 is an exploded elevational view of one of the spool assemblies.

The ten spool assemblies 74 and the ten spool assemblies 76 are all identical, and hence only one of the spool assemblies 74 will be described in detail. The spool assembly 74 (or 76) includes (FIGS. 5 and 6) a spool 84 having side flanges 86 and 88, the spacing between which is slightly greater than the width of the fiml strip 78 which is wound around the spool 84. Projected axially beyond the flange 86 is an actuating spindle 90 which is received in a circular aperture 92 in the fixed sidewall 14. The spindle 90 projects beyond the fixed sidewall 14 where its end is rounded or dome-shaped. Encircling the spindle 90 at a cylindrical boss 93 on the flange 86 is an elastomeric braking ring 94 which normally bears aginst the inside face of the fixed sidewall 14 and prevents free rotation of the spool 84. The other flange 88 has a large and small diameter cylindrical bosses 96 and 98 projected axially from it in that order and the small diameter boss 98 has a pulley spindle 100 projected axially from it. The spindle 100 fits into an aperture 102 in the removable sidewall 16. In this regard, the two apertures 92 and 102 are sized to permit the spindles 90 and 100 to rotate freely within them so that the spool 84 will rotate within the housing. The large diameter boss 96 serves as a mount for an elastomeric drive ring 104 which encircles it and forms a friction surface on the spool 84. The drive ring 104 is backed by the flange 88 and when so positioned projects axially slightly beyond the end of the boss 96. The drive ring 104 may be a common O-ring formed from a suitable elastomer.

The pulley spindle 100 serves as a journal for a pulley 106 (FIGS. 4 and 5) which normally rotates freely thereon. The pulley 106 has a central recess 108 which opens toward the small boss 98, and this recess receives a coil-type compression spring 110 which encicles the spindle 100. One end of the spring bears against the pulley 106 within the recess 110, while the other end surrounds the small boss 98 and bears against the large boss 96. The end face out of which the recess 108 opens forms a friction surface which is located opposite to the drive ring 104. On its opposite face, the pulley 106 has a small boss 112 which projects axially therefrom and is urged against the inside face of the removable sidewall 16 by the sprng 110. The end of the pulley spindle 100 is squared off and located within the aperture 102 of the removable sidewall 16 where it is provided with a metal insert or button 114.

Figure 6:
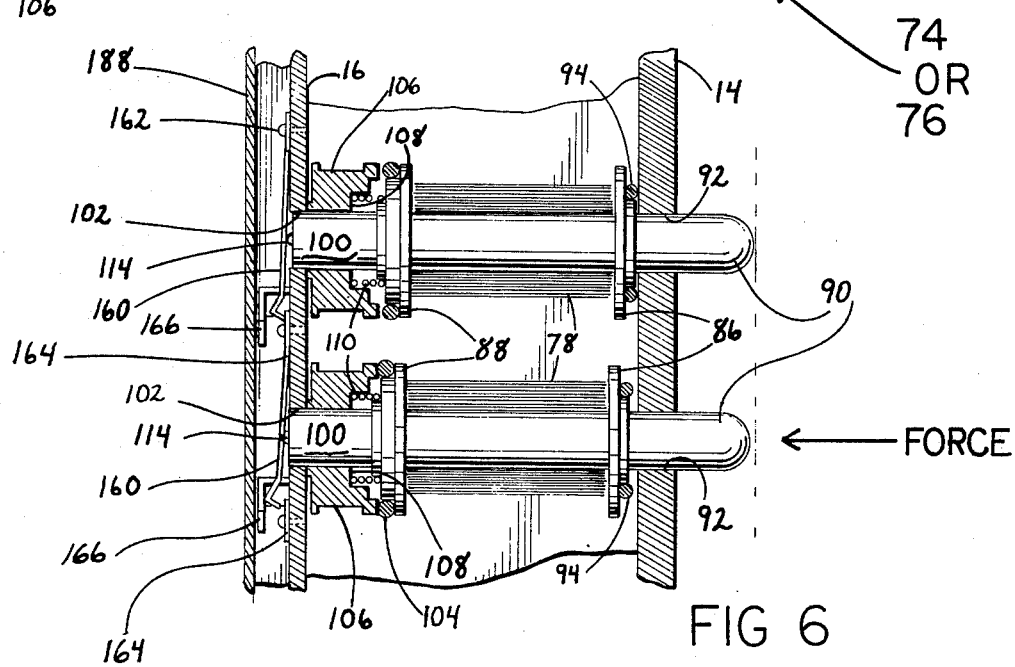
FIG. 6 is a sectional view taken along lines 6—6 of FIG. 2 and showing two spool assemblies, the one being in its outer braked position and the other being depressed into its drive position.
Figure 7:
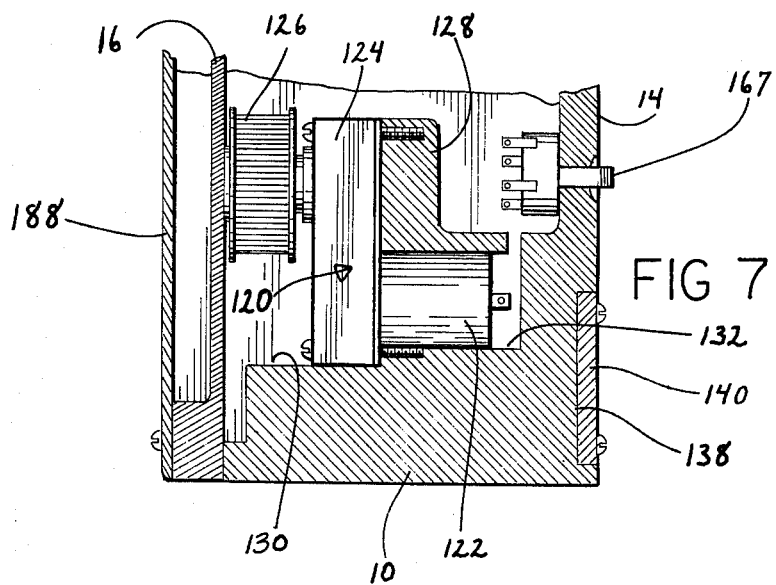
FIG. 7 is a sectional view taken along lines 7—7 of FIG. 2 and showing the drive unit in the bottom wall of the housing.
Figure 11:
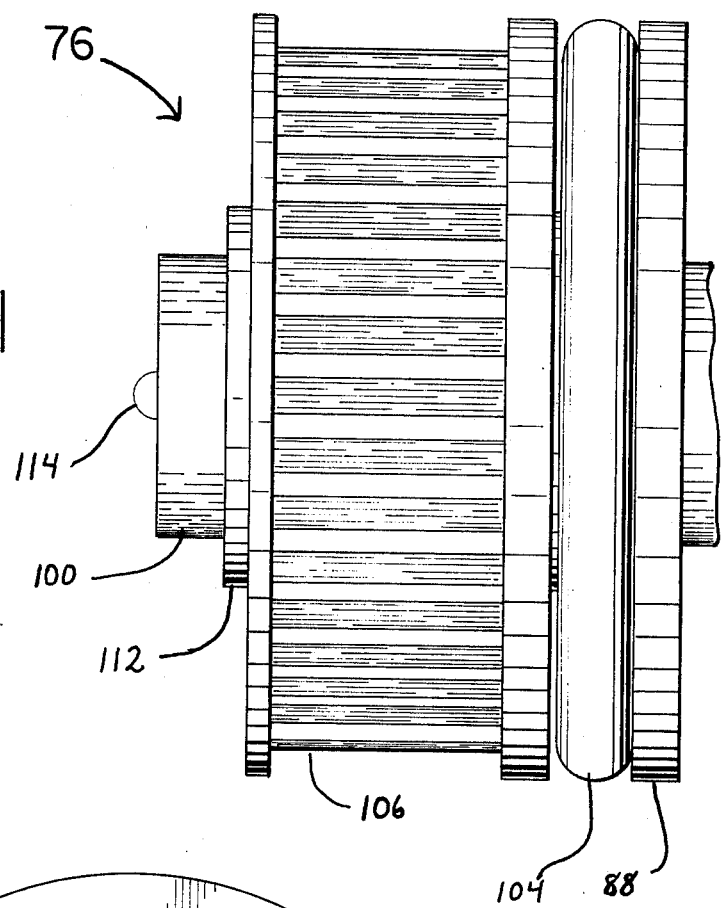
FIG. 11 is a fragmentary side elevational view of one of the spool assemblies showing the drive pulley thereon.
Figure 12:
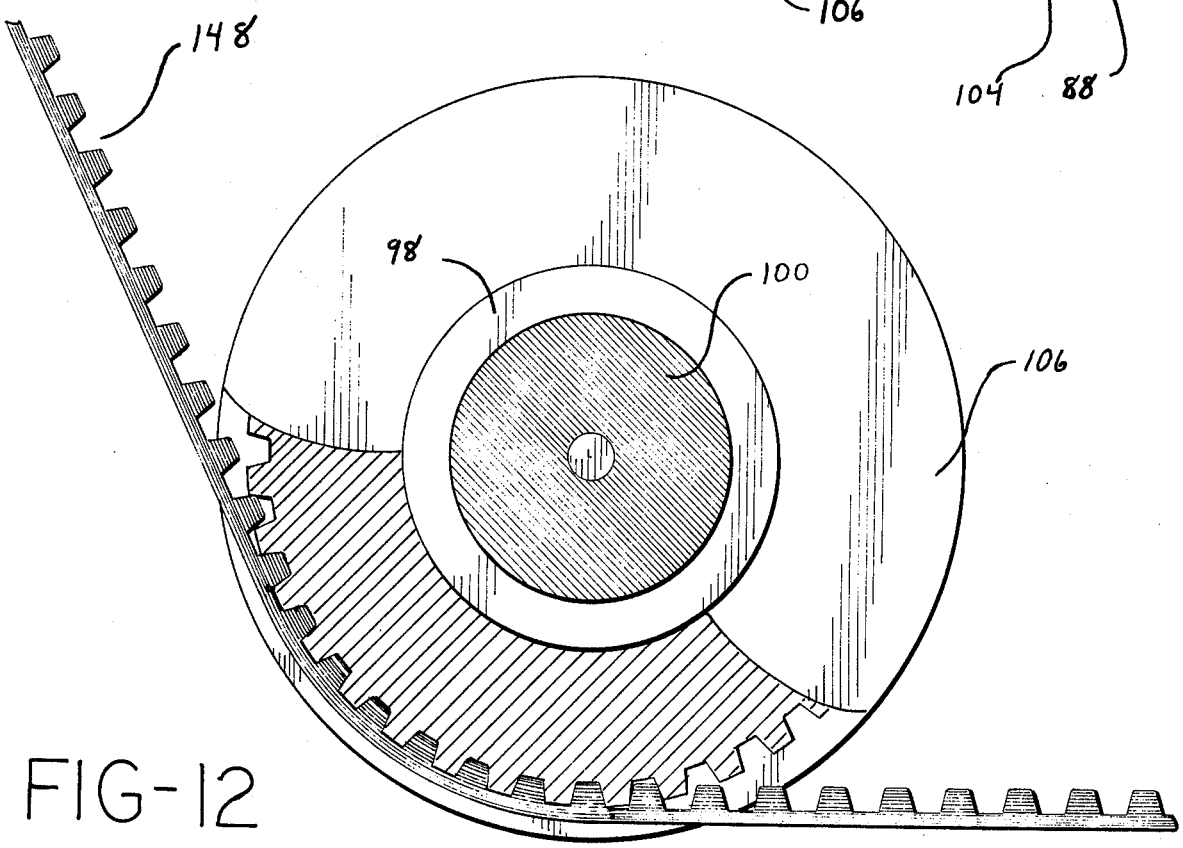
FIG. 12 is an enlarged fragmentary view partially broken away and in section of one of the drive pulleys with a belt extended past it.

The spring 110 urges the side flange 88 on the spool 84 away from the pulley 106, thus forcing the braking ring 94 against the sidewall 14 and the boss 112 of the pulley 106 against the sidewall 16 (FIG. 6 — upper spool). The spacing between the sidewalls 14 and 16 of the housing 2 is such that when the braking ring 94 of the spool 84 is against the sidewall 14 and the boss 112 of the pulley 106 is against the removable sidewall 16, the drive ring 104 will be spaced slightly away from the side face of the pulley 106. Thus, the pulley 106 will merely revolve on the pulley spindle 100, but the spool 84 will not rotate due to the braking effect of the braking ring 94 which bears against the sidewalls 14. However, when the spool 84 is moved axially toward the pulley 106 as a result of a force being applied to the actuating spindle 90 beyond the wall 14, the braking ring 94 will move away from the wall 14, while the drive ring 104 will move into engagement with the side of the pulley 106 (FIG. 7 — lower spool). Hence, as long as a force is maintained on the actuating spindle 90, any rotation of the pulley 106 will be imparted to the spool 84 and the film strip 78 on that spool 84 will wind around it. The pulley 106 is configured to accommodate two synchronous belts located side by side on it (FIGS. 11 and 12). Accordingly, the pulley 106 has circumferential spaced teeth or ribs around its periphery, and these ribs will mesh with the ribs on the inside face of a synchronous belt.

In addition to the ten spool assemblies 74, the upper spool cavity 70 contains an idler pulley 116 (FIG. 2) which is located therein between the spool assemblies 74*d* and *g*. All of the pulleys 106 for the spool assemblies 74 in the upper cavity 70 align, and the idler pulley 116 likewise aligns with these pulleys 106. The pulleys 106 in the lower spool cavity 72 also aligns with themselves as well as with the pulleys 106 in the upper spool cavity 70. All of the pulleys 106 are driven by a drive unit 120 which is mounted on the thick bottom wall 10.

Figure 8:
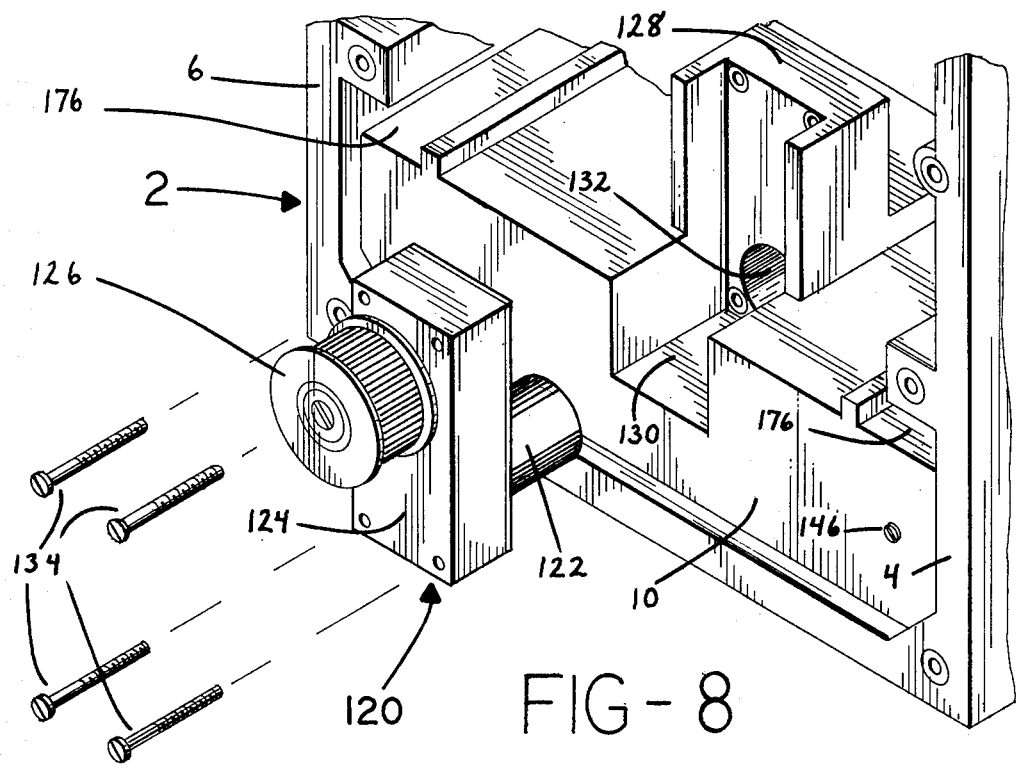
FIG. 8 is an exploded fragmentary perspective view of the lower portion of the housing and showing the drive unit aligned with the recess and bore into which it fits.

The drive unit 120 includes (FIGS. 7-9) a direct current permanent magnet motor 122, a gear box 124, and a drive pulley 126. The motor 122 is attached to the gear box 124 and its drive shaft projects into the gear box 124, rotating the initial set of gears therein. The drive pulley 126 is attached to the output shaft of the gear box 124. Thus, the motor 122 rotates the drive pulley 126, with the power being transferred through the gear box 124, preferably at a 200 to 1 speed reduction. The motor 122 is reversible, and also preferably has two speeds.

To accommodate the drive unit 120, the bottom wall 10 of the housing 2 is provided with centrally located upstanding boss 128 having a rectangular recess 130 opening laterally out of it toward the removable sidewall 16. The recess 130 also extends downwardly into the major portion of the bottom wall 10 where the wall 10 is further provided with a bore 132 which opens into the recess 130. The bore 132 is sized to receive the motor 122 and when the motor is in it, the gear box 124 is received in the recess 130. The gear box 124 is secured to the bottom wall 10 by screws 134. With the motor 122 and gear box 124 so positioned, the drive pulley 126 aligned with and located between the pulley 106 of the lower spool assemblies 76d and 76g. Thus, the drive pulley 126 also aligns with all of the pulleys 106.

On each side of the rectangular recess 130 and the gear box 124 in it, the bottom wall 10 is provided with a pair of battery cavities 136 (FIG. 1) which open out of the fixed sidewall 14. The ends of the cavities 136 actually terminate at an elongated recess 138 into which a closure plate 140 fits such that the plate 140 is flush with the exterior surface of the fixed sidewall 14. Thus, the battery cavities 136 are closed at one end by the plate 140. Their opposite ends terminate within the wall 10 and are likewise closed. The battery cavities 136 contain batteries 142 as well as suitable contacts and connecting wires which electrically connect the batteries 142 in series. The battery pack so formed has a positive terminal 144 and a negative terminal 146 (FIG. 2) located on that portion of the wall 10 which is normally covered by the removable sidewall 16.

Figure 10:
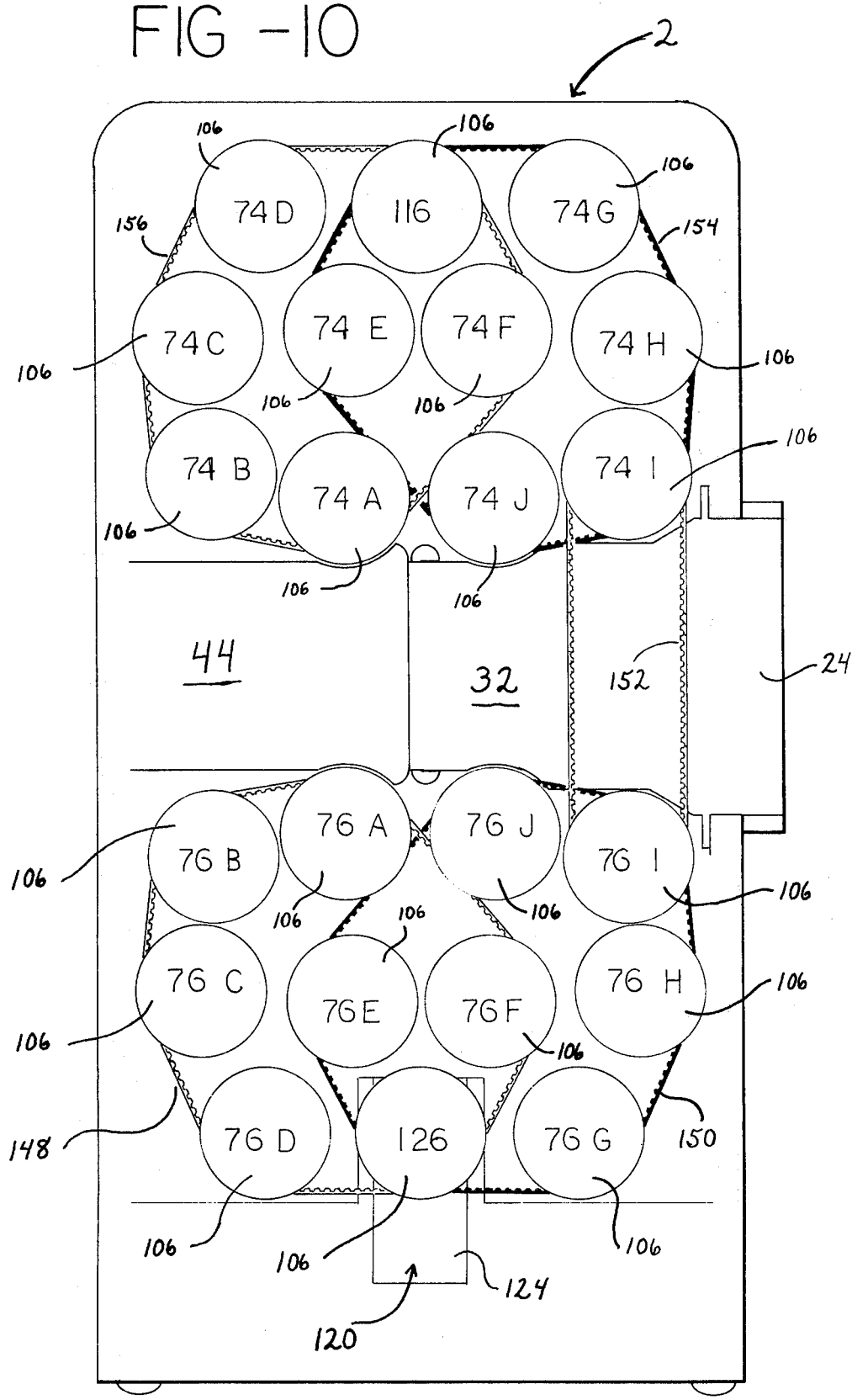
FIG. 10 is a sectional view of the housing showing the several belts trained around the drive pulleys of the various spool assemblies.

The motor 122 when energized drives the drive pulley 126 on the gear box 130 at a substantially reduced speed, and the drive pulley 126 is connected with the pulleys 106 on the spool assemblies 74 and 76 through a plurality of synchronous belts, all of which are located adjacent to the removable sidewall 16 (FIG. 10). In particular, one belt 148 is trained around the drive pulley 126 and the pulleys 106 of the spool assemblies 76 d, c, b, a, f. Another belt 150 is trained around the drive pulley 126 and the pulleys 106 of the spool assemblies 76 e, j, i, h, g. In this regard, it will be called, that each pulley 106 and 126 is wide enough to accommodate two belts side by side so the two belts 148 and 150 do not interfere with each other on the drive pulley 126, nor do they interfere where they cross each other between the spool assemblies 76a and j. Still another belt 152 extends between the pulleys 106 of the spool assembly 76i in the lower cavity 72 and the spool assembly 74i in the upper cavity 70. This belt 152 is located to the side of the viewing tunnel 32 and of course drives the pulley 106 of the spool assembly 74i. Another belt 154 is trained around the pulley 106 of the spool assembly 74i and also around the pulleys 106 of the spool assemblies 74 j, e, g, h, as well as around the idler pulley 116. Yet another belt 156 extends around the idler pulley 116 and the pulleys 106 of the spool assemblies 74f, a, b, c, and d, thus driving those spool pulleys 106 from the idler pulley 116. The belts 148, 150, 152, and 156 tie all of the pulleys 106, 115 and 126 together so that when the pulley 126 is turned by the motor 122, all of the pulleys 106 will rotate in unison and in the same direction. All of the belts 148, 150, 152, 154 and 156 are of the synchronous variety, that is, they are provided with teeth which mesh with teeth in the pulleys 106, 116 and 126 so that a positive connection exists between the motor 122 and the pulleys 106. Preferably, the pitch of the belts is 0.080 or 0.816 inches. These belts are sometimes called timing belts.

The upper spool assemblies 74 f, g, h, i, j, when rotated clockwise will cause the films 78 f, g, h, i, j, to advance into the upper cavity 70, while the upper spool assemblies 74 a, b, c, d, e, when rotated counterclockwise will cause the films 78a, b, c, d, e, to advance into the upper cavity 70. On the other hand, the lower spool assemblies 76 a, b, c, d, e, when rotated clockwise will cause the films 76 a, b, c, d, e, to move into the lower cavity.

Figure 13:
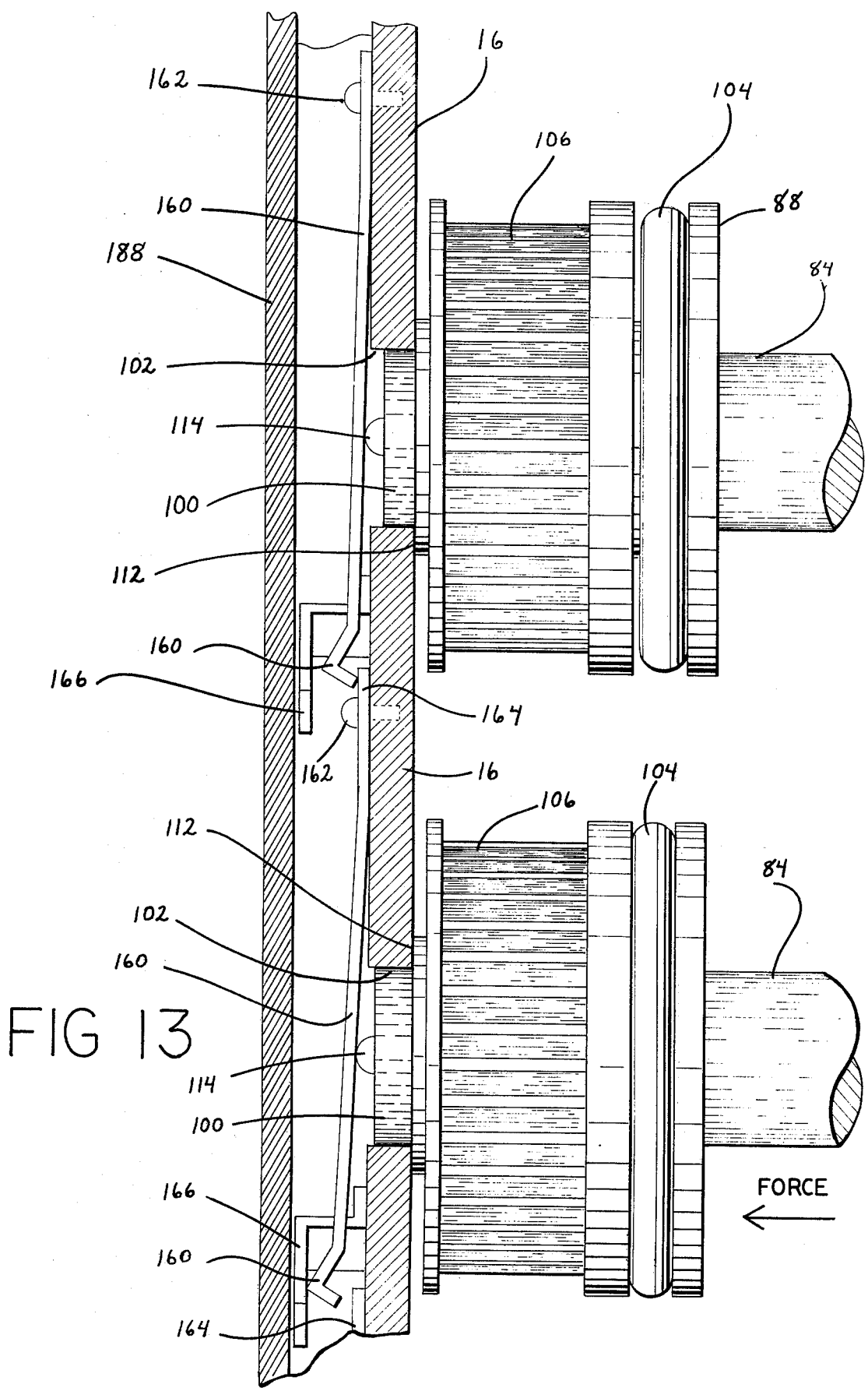
FIG. 13 is a fragmentary sectional view showing the contactors and the spool assemblies with the one spool assembly being in its braked position and the other being in its drive position wherein its contactor pressed against the corresponding overlying contact.

The removable sidewall 16 is hollowed out at its face presented away from the spool cavities 70 and 72, and within this hollowed out space is provided with a plurality of spring metal contactors 160 (FIGS. 6, 13 and 14). A separate contactor 160 is associated with each spool assembly 74 and 76. More specifically, each contactor 160 is an elongated strip of spring metal which is flat at its one end where it is anchored to the sidewall 16 by a rivet or screw 162. The contactor 160 extends over the circular aperture 102 for the spool assembly 74 or 76 with which it is associated, and at its other end is turned outwardly and then inwardly to form two contact points thereon (FIG. 6), one being at its extreme end and the other being at the V-shaped configuration where the metal strip turns inwardly again. The contact at the extreme end normally bears against an underlying contact 154 on the wall 16. Indeed, the natural resiliency of the contactor 160 causes its free end to bear against the contact 165. The other contact point is seated under an overlying contact 166. When the contactor 160 is against the underlying contact 154, it is spaced from the overlying contact 156 and vice-versa. In this regard, it should be noted that when the spool 84 for the spool assembly 74 or 76 with which the contactor 160 is associated is in its normal position, that is with the spring 110 urging the spool 84 against the fixed wall 14 (FIGS. 6 and 13 upper spools), the insert 114 on the end of the pulley spindle 100 will be located within the aperture 102 and will not affect the contactor 160. However, when the spool 84 is moved to its drive position by applying a force to the actuating spindle 90 (FIGS. 6 and 13 — lower spool), the pulley spindle 100 will project further through the aperture 102 and will bear the midportion of the contactor 160 with its insert 114. The movement is sufficient to lift the contactor 160 off of the underlying contact 154 and bring it against the overlying contact 156.

In most cases, the underlying contact 164 is the anchored end of another contactor 160 (FIG. 14), but in some cases it is a metal connector strip 168 which leads to and is electrically connected with the anchored end of another contactor 160. Moreover, the underlying contact 164 for the lower spool assembly 76c is connected with the contactor 160 for the upper spool assembly 74d by a wire 170 which extends between the two spool cavities 70 and 72. The arrangement is such that all of the contactors 160 are connected in series with the contactor 160 for the spool assembly 76d being at the beginning of the series. That first contactor 160 is connected to the terminal 144 of the battery pack formed by the batteries 142. The series connection is broken when any one of the contactors 160 is lifted away from its underlying contact 164. Interposed between the first contactor 160 and the terminal 144 of the battery pack is a main switch 167.

The overlying contacts 166 for the spool assemblies 74 f, g, h, i, j and the spool assemblies 76 a, b, c, d, e, are all electrically connected together by a wire 172 (FIG. 14) to a relay 174 which is located in a channel 176 in the bottom wall adjacent to the rear wall 6. Similarly, the overlying contacts 166 for the spool assemblies 74 a, b, c, d, e, and for the spool assemblies 76 f, g, h, i, j are all electrically connected together by another wire 178 which is connected to a relay 180 located in another channel 176 adjacent to the front wall 4.

Both relays 174 and 180 are connected to the negative terminal 146 of the battery pack. Thus, when the main switch 167 is closed and one of the spool assemblies 74 *f, g, h, i, j* or spool assemblies 76 *a, b, c, d, e*, is depressed to bring its contactor 160 against its overlying contact 166, the relay 174 will be placed across the terminals 144 and 146 of the battery pack and energized. Likewise, when one of the spool assemblies 74 *a, b, c, d, e*, or the spool assemblies 76 *f, g, h, i, j* is depressed, the relay 180 will be placed across the terminal 144 and 146 and energized.

Both relays 174 and 180 are solid state devices and hence are extremely small. They are classified as double pole, single throw relays and when energized complete two circuits through them. The relays 174 and 180 and the circuits through them are schematically illustrated in the drawings (FIG. 15). The motor 122 has two leads coming from it and both of these leads are connected to each of the relays 174 and 180. Moreover, the relays 174 and 180 on the opposite sides thereof from which the motor leads extend are connected to the terminals 144 and 146 of the battery pack. Thus, when either relay 174 or 180 is energized, it will place the motor 122 across the terminals 144 and 146 of the battery pack so that the motor 122 will be energized and the drive pulley 126 will be powered by it. However, the arrangement is such that the relay 180 reverses the polarity in comparison to the relay 174 so that when the relay 174 is energized the motor 122 will rotate in one direction and when the relay 180 is energized the motor 122 will rotate in the opposite direction.

The wire 172 is further connected to a red directional light 182 (FIG. 1) the other terminal of which is connected to the battery pack terminal 146 through the main switch 167. Thus, when any of the spool assemblies 74 *f, g, h, i, j* or 76 *a, b, c, d, e*, is depressed, the red light 182 will be illuminated in addition to the relay 174 being energized. The other connecting wire 178 is connected to a green directional light 184 (FIG. 1), the other terminal of which is connected to the battery pack terminal 146 through the main switch 167. Therefore, the green light 184 will be illuminated when any of the spool assemblies 74 *a, b, c, d, e*, or 76 *f, g, h, i, j* is depressed. The red light 182 indicates when the motor 122 is revolving in one direction and the green light 184 indicates when it is revolving in the opposite direction. The lights 182 and 184 are set into the front wall 4 immediately above the viewing window frame 24. They are preferably light-emitting diodes.

The main switch 167 is also in circuit with the bulb 62 of the lamp assembly 56 so as to control that bulb, and further controls another indicator light 186 which indicates when the switch 167 is closed and the bulb is illuminated. In other words, the switch 167 places the light 186 across the terminals 144 and 146 of the battery pack when the switch 167 is closed. The light 186 is located in the front wall 4 above the directional lights 182 and 184.

The hollowed out portion of the removable sidewall 16 is covered by the cover plate 188 which obscures and protects the contactors 160, the contacts 162, and 164, and much of the circuitry associated with them.

The film strips 78 have individual frames thereon with each frame being about the same size as the transparent pressure shoe 36 in front of the gate 52 (FIG. 16). Each frame is numbered with the numbering on each strip 78 commencing at 0 and going as high as 363. While the location of the numbers on the frames of an individual strip 78 are the same, these number locations vary between the strips 78. Thus, the frame numbers on the film strip 78*d* are in the upper right portions of the frame, while the frame numbers for the strip 78*j* are in the lower right portions of the frames. Each frame number, irrespective of its location on the frame, is located next to a horizontal registration mark *m* (FIG. 16).

Each film strip 78 is devoted to a particular facial feature in that the frames of that strip illustrate only variations of that facial feature. The facial features and the film strips 78 on which they are depicted are listed below:

| Facial Feature | Film Strip |
|---|---|
| beards, moustaches | 78j |
| glasses | 78i |
| nose | 78h |
| hair | 78g |
| lips | 78f |
| brow | 78e |
| eyes | 78d |
| headshape-chin | 78c |
| age lines, wrinkles | 78b |
| ears | 78a |

The film strips 78 are arranged in the foregoing order behind the shoe 36. Those frames of the film strips 78 which are designated by the numeral zero are blank and are used when a particular facial feature, such as a beard or eye glasses, is not in the portrait and also when it is desired to clear the gate 52 of all images. The same scale is utilized with each film strip 78 so that noses will be in proportion to lips, eyes, and the like. Also, the lateral location of the features on one film strip 78 are in the correct relationship to features on other film strips 78. Thus, noses, and lips are generally centered with respect to eyes and ears. Since the film strips 78 are superimposed on one another within the gate 52, it is possible to construct a large number of composite portraits, but this requires precise positioning of the film strips 78 in the direction of the advance, that is, the vertical direction. For example, the film strip 78*h* containing noses, must be properly positioned in the vertical direction with respect to the film strip 78*g* containing hair so that the nose on any frame of the former will be located the proper distance below the hair on any frame of the latter.

This precise positioning is achieved by aligning the registration marks *m* (FIG. 16) on the film strips 78 with corresponding registration marks *n* (FIG. 16) along the right side of the transparent pressure shoe 36. Since the location of the film registration marks *m* vary from one film strip 78 to another, at least one registration mark *n* is provided on the shoe 36 for each film strip 78. Indeed, for most of the film strips 78 several registration marks *n* are provided at closely spaced intervals in the vertical direction to compensate for variations in the vertical positioning of facial features amongst different individuals. The registration marks *n* are designated by letters which are arranged in alphabetical order from the top of the shoe 36 to the bottom thereof. Moreover, the marks *m* for each film strip 78 are contained within zones *o* clearly delineated on the shoe 36 by horizontal markings *p* of extended length, and each zone *o* bears the written designation as to which film strip 78 applies to it. For example, four vertically spaced registration marks *n* designated by the letters E, F, G, and H and contained within a zone *o* marked "hair" are used to locate frames on the film strip 78*g* for hair. For an elongated face the registration mark n on the hair frame which fits that face will most likely be aligned with one of the upper registration marks n for hair such as the marks n beside the letters E or F, since that will have the effect of raising the hair slightly and elongating the face. The chin may be dropped in a similar manner, that is, by using the lower chin marks n designated by the letters K or L. No two zones o have the same letters designating the registration marks in those zones o. The vertical relationship between some features, such as the ears and the eyes, do not vary significantly between different individuals, and hence only one registration mark n is provided for the film strips 78a and d containing these features. Where several registration marks n are provided for a feature, one is made thicker than the others to indicate the most common or normal location of that feature.

The other in which the film strips 78 are arranged within the gate 52 gives some degree of perspective to the composite portrait which is formed.

On the other or left side of the shoe 36 vertical registration marks q (FIG. 16) are provided, while the frames of the film strips 78 have similar registration marks r (FIG. 16). When the marks r on the film strips 78 align with the marks q on the shoe 36, the film strips 78 are correctly positioned insofar as the lateral direction is concerned. This lateral positioning is maintained by the flanges 86 and 88 on the spools 84. Thus, the noses on the film strip 78h will be centered with respect to the eyes of the film strip 78d, etc.

In lieu of using the registration marks n on the pressure shoe 36 and the marks m on the film strips 78 for the purpose of locating the various facial features in the correct position within the film gate 52, the film strips 78 at the frames thereon may be provided with small rectangular markings S (FIG. 17). The space enclosed by each rectangular marking S is slightly larger than any one of the identifying letters in the zones O of the pressure shoe 36. The lateral positioning of the rectangular markings S is such that they pass behind the identifying letters in the zones O as the film strips 78 are moved. As to the longitudinal or vertical positioning of the rectangular markings S, that is such that when the markings S of any frame is behind the appropriate identifying letter such that it frames the letter, the features on that frame will be located in the proper vertical position within gate 52. Again, where a zone O contains several letters, the vertical position of the frame may be varied slightly to account for possible variations in that feature between different individuals. While the registration marks n are eliminated from the pressure shoe 36, within each zone O the pressure shoe 36 is provided with a small dot T which denotes the identifying letter within the zone O representing the average or normal location for the facial feature.

To provide a ready reference, the facial features for each of the various films 78 are illustrated together on the pages of an index C (FIG. 18). Each facial feature on the index C is assigned a number which is the same as the frame number for that facial feature on the pertinent film strip 78. This enables one to readily select the individual facial features which according to his recollection correspond most closely to those of the person he is trying to identify.

The film strips 78 may contain illustrations other than those which create a portrait. For example, they may show a various component of a piece of machinery, and the manner in which it is assembled. They may also show the development of an oscilloscope pattern such as used in automotive diagnostic facilities.

OPERATION

To construct a composite illustration wih the visualizer V, the various film strips 78 must be advanced until the proper frame on each is in the gate 52. The advancement must cease precisely when the registration mark m on the frame aligns with the registration mark n on the pressure shoe 36.

Figure 2:
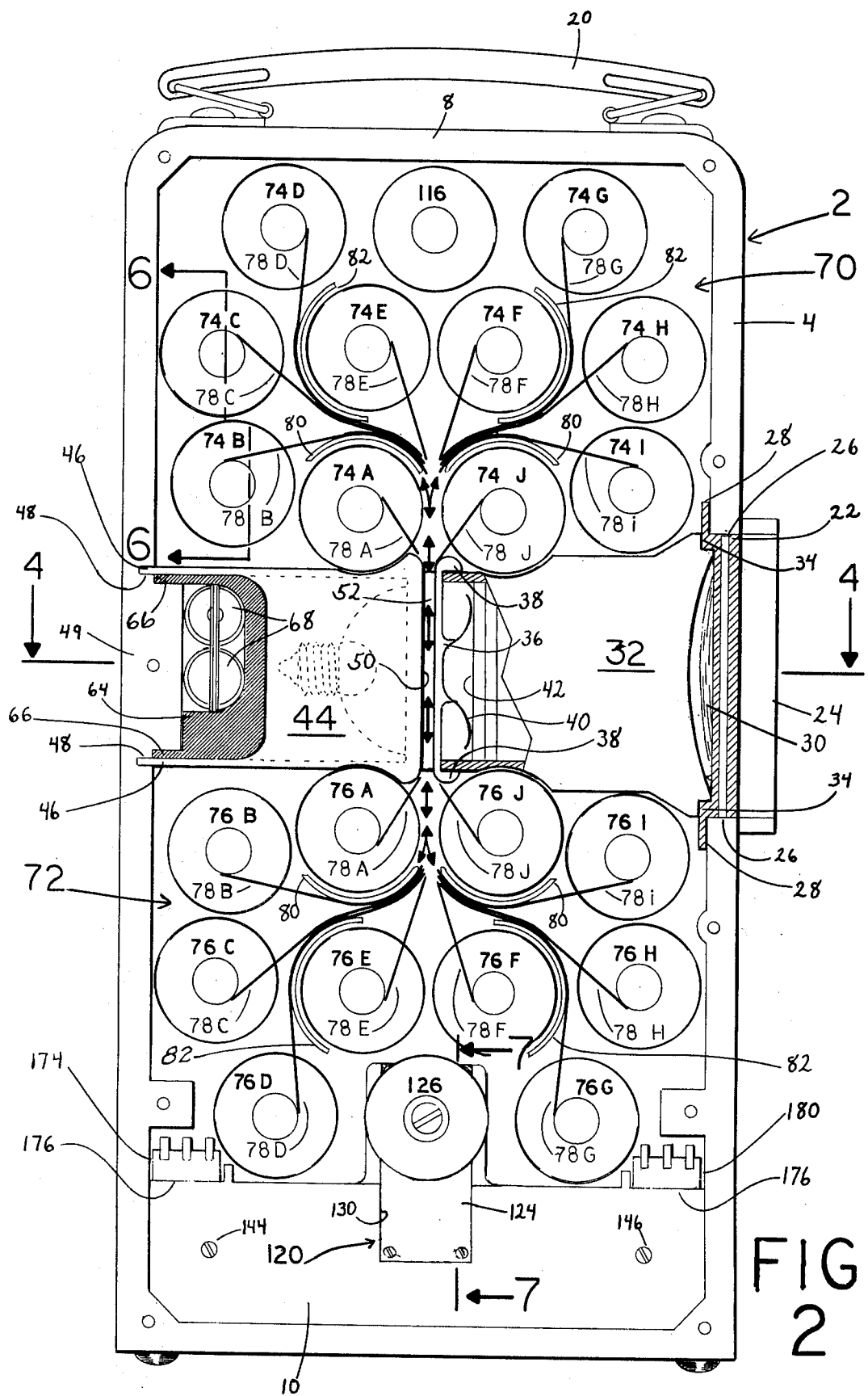
FIG. 2 is a sectional view along line 2—2 of FIG. 1 and showing the interior of the visualizer.

Each film strip 78 is advanced into the upper spool cavity 70 by pressing the actuating spindle 90 for the spool assembly 74 associated with that film strip 78 inwardly. For example, if it is desired to advance the film strip 78f into the upper cavity 70, the actuating spindle 90 for the spool assembly 74f is depressed toward the housing 2 merely by applying finger pressure to it (FIG. 6A). This shifts the entire spool 84 toward the removable sidewall 16, and as a result the rubber braking ring 94 leaves the wall 14 and the rubber drive ring 104 contacts the side of the pulley 106. In effect the components of the spool 84 and its spool pulley 106 in the vicinity of the ring 104 function as a clutch for coupling the spool 84 to the pulley 106. Moreover, the pulley spindle 100 passes through its aperture 102 in the sidewall 16 and the metal insert 114 thereon lifts the contactor 160 away from the underlying contact 164 and forces it against the overlying contact 166. This energizes the relay 174 which in turn energizes the motor 122 such that all the pulleys 106 rotate clockwise (FIG. 2). Since the spool 84 of the spool assembly 74f is held against its pulley 106 and frictionally coupled thereto at the drive ring 104 in the nature of a clutch, the spool 84 of the assembly 74f will rotate clockwise and wind the film strip 78f around it. The film strip 78f will pay off of the spool 84 of the spool assembly 76f in the lower cavity 72, and consequently the spool 84 thereof will also rotate. In this regard, while the spring 110 urges the braking ring 94 against the fixed sidewall 14, the frictional drag caused thereby on the spool 84 off of which the film strip 78f is paying is not great enough to significantly retard the motor 122. The pulleys 106 of the remaining spool assemblies 74 and 76 merely rotate on their spindles 100 since those pulleys 116 are held away from their respective drive rings 104 by the springs 110. The remaining film strips 78 likewise remain fixed in position, inasmuch as the springs 110 force the rubber braking rings 94 against the sidewall 14 and prevent rotation of the spools 84 associated therewith.

The film strip 78f advances for as long as the actuating spindle 90 remains depressed. When the desired frame arrives in the gate 52 and the registration mark m thereon aligns with the registration mark n on the pressure shoe 36, the actuating spindle 90 is released and the spring 110 forces the spool 84 toward the wall 14, causing the braking ring 94 to be compressed between the wall 14 and the side flange 86 on the spool 84 (FIG. 6). This causes the spool 84 to stop rotating immediately. The spool 84 on the corresponding spool assembly 76f stops rotating also since its braking ring 94 is likewise forced against the sidewall 14 by its spring 110. The motor 122 likewise stops since the circuit to the relay 174 is broken when the spring contactor 160, by virtue of its own resiliencey, moves back to its underlying contact 164.

To advance the film strip 78f if the opposite direction, that is, into the lower spool cavity 72, the actuating spindle 100 of the spool assembly 76f is depressed. This moves the contactor 160 for that spool assembly against its overlying contact 166 and the other relay 180 is energized, causing the motor 122 to rotate in the opposite direction. Hence, all of the pulleys 106 rotate counterclockwise (FIG. 2), but since only the spool 84 of the spool assembly 76f is frictionally engaged with its pulley 106, only that spool is powered. The film strip 78f therefore winds around the spool 84 of the spool assembly 76f.

The remaining spool assemblies 74 and 76 are operated in the same manner to advance their respective film strips 78 into either the upper or lower cavities 70 or 72, depending on whether the actuating spindle 90 of an upper spool assembly 74 or the actuating spindle 90 of a lower spool assembly 76 is depressed. Also, the film strips 78 may be advanced manually merely by turning the portions of the spindles 90 projected beyond the sidewall 14.

Only one spool assembly 74 or 76 may be operated at a time, since all of the contactors 166 for the spool assemblies 74 and 76 are in series. The operation of one breaks the series circuit, preventing the operation of any of the others which are beyond it in the series.

The directional lights 182 and 184 indicated the direction in which the moving film strip 78 is advancing, while the light 186 indicates when the main switch 167 is closed.

Once a composite illustration is composed, that illustration may be easily reproduced by others having the visualizers V. In particular, any combination of frames in the gate 52 is easily identified by a series of numerals and letters. The numerals, of course, represent the numerals assigned to the various frames on the film strips, while the letters are those appearing on the transparent shoe 56 adjacent to the registration marks n. Thus, the 12th frame for the film strip 78d, which pertains to eyes, would be identified as "12A" or, using the phonetic alphabet, "12 alpha". The 68th frame on the film strip 78g, which pertains to hair, might be designated 68E, 68F, 68G or 68H, depending on the vertical location of the hair. The remaining frames in the gate 52 are identified in a similar manner. Thus, a composite portrait might be identified as 12A, 6C, 68G, 31K, 23M, 42P, 18R, 9T, 7V, 10W. The phonetic alphabet may of course be used. Such identifications are easily transmitted by way of telephone or radio. Thus, when the visualizer V is used by police for apprehending criminals, it is possible to have an illustration of the criminal suspect at a multitude of locations within minutes of the completion of the original composite by the witness.

The visualizer V is completely portable and carries its own power supply. Thus, it may be transported in police cars and carried directly to one who has witnessed a crime. Also, the device does not require controlled light conditions, and indeed may be used in broad daylight.

This invention is intended to cover all changes and modifications of the example of the invention herein chosen for purposes of the disclosure which do not constitute departures from the spirit and scope of the invention.

What is claimed is:

1. A visualizer apparatus comprising: a housing; means defining a film gate in the housing; means for illuminating one side of the film gate; a plurality of spools in the housing beyond the film gate; a plurality of film strips in the housing and superimposed on each other with the film gate to form a composite illustration when properly aligned, each film strip being connected to a different spool so that when any spool is rotated in the proper direction the film strip connected to it will wind around the spool; a rotatable drive element associated with each spool in the housing and normally being disengaged from its spool so that it will rotate independently of its spool; an electric motor in the housing; means coupling the electric motor with the drive elements for all of the spools so that when the electric motor is energized all the drive elements will rotate; clutch means associated with each spool for coupling the spool with its respective drive element when the clutch means is actuated; and separate switch means associated with each clutch means for electrically connecting the motor with a source of electrical energy when the clutch means associated with the switch means is actuated, whereby when a specific clutch means is actuated, the electric motor will be energized, causing all the drive elements to rotate, and the spool associated with the actuated clutch means will rotate so that its film strip will wind around it.

2. A visualizer apparatus according to claim 1 wherein the drive element for each spool is a spool pulley, and the means coupling the electric motor with the drive elements comprises a plurality of endless belts arrange such that at least one belt is around each pulley and such that all belts move when the motor is energized.

3. A visualizer apparatus according to claim 2 wherein the spool pulley for each spool is axially aligned with its spool, and the clutch means comprises opposed surfaces on the spool and its pulley, a spring for urging the opposed surfaces apart, and actuating means for moving one of the surfaces against the other of the surfaces in opposition to the force exerted by the spring so that the spool will rotate with its spool pulley.

4. A visualizer apparatus according to claim 3 wherein at least one of the opposed surfaces is an elastomeric material.

5. A visualizer apparatus according to claim 3 wherein no one belt is trained around all of the spool pulleys and some of the spool pulleys have two belts trained around them to transfer the rotational movement from one group of spool pulleys to another.

6. A visualizer apparatus according to claim 3 in which the switch means for each spool is moved by the actuating means.

7. A visualizer apparatus according to claim 6 wherein clutch means for each spool further includes a pulley spindle on which the spool pulley for the spool is mounted, the pulley spindle moving axially with respect to the spool pulley when the actuating means causes the opposed surfaces to come together, the pulley spindle further bearing against and operating the switch when it is moved axially with respect to the drive pulley.

8. A visualizer apparatus according to claim 7 wherein the spool further has an actuating spindle on its end opposite from the pulley spindle, and wherein the actuating and pulley spindles are received in apertures within the housing, whereby when the actuating spindle is depressed, the spool moves toward the pulley and the opposed surfaces of the spool and pulley engage each other.

9. A visualizer apparatus according to claim 8 wherein the actuating spools are exposed externally of the housing so they may be manually depressed.

10. A visualizer apparatus according to claim 8 wherein each spool has a braking surface which is located adjacent to the housing and is normally urged against the housing by the spring.

11. A visualizer apparatus according to claim 8 and further comprising an electrical circuit connected with the motor for delivering electrical energy thereto; and the switch means for each spool is in the electrical circuit and includes a contactor which moves in response to movement of the spool relative to its spool pulley.

12. A visualizer apparatus according to claim 11 wherein the contactor for each spool is located beyond the end of the pulley spindle for that spool, and when the spool is moved by a force applied to its actuating spindle, the pulley spindle moves against the contactor and moves the contactor.

13. A visualizer apparatus according to claim 1 and further comprising first registration marks at the film gate and second registration marks located on the film strips, with the second marks being located such that when brought into predetermined relationship with the first registration marks, the film strips will be properly positioned within the gate.

14. A visualizer according to claim 13 wherein the film strips are provided with frames, each having a registration mark and being designated by a different numeral, and the registration marks at the film gate are designated by different letters, whereby each composite illustration composed may be identified as a series of numerals and letters which are easily transmitted by telephone or radio.

15. A visualizer apparatus comprising a housing having a front wall, a back wall and sidewalls, at least one of the sidewalls being initially removed from the front and back walls so as to expose the interior of the housing, the front wall having an opening, the side of which is closed by said one sidewall; a viewing tunnel located within the housing and extending inwardly from the front wall, the viewing tunnel being removable from the housing when said one sidewall is removed; a viewing window frame received in the opening in the front wall and having a lens therein which closes the front of the viewing tunnel, the frame further having grooves along its edges to accommodate the front wall therein, whereby the viewing window frame will slide out of the front wall when the said one sidewall is removed; a lamp house in the housing adjacent to the back wall thereof and having a light transmitting plate located directly beyond the end of the viewing tunnel and a source of light positioned behind the plate to illuminate the plate, the lamp house being removable from the housing when said one sidewall is removed; a transparent pressure shoe carried by the viewing tunnel and located opposite the end plate of the lamp house, whereby a gate is formed between the shoe and plate the shoe being movable toward and away from the plate; springs on the shoe and bearing against the tunnel for urging the shoe toward the plate; a plurality of film strips within the housing and having illustrations thereon, the film strips being extended through the gate where they are superimposed so that the illustrations on the individual film strips form a composite illustration which is visible through the viewing tunnel; and means for moving the film strips individually and independently through the gate.

16. A visualizer apparatus according to claim 15 wherein the lamp house slidably engages the back wall.

17. A visualizer apparatus according to claim 15 wherein the viewing tunnel is at its forward end engaged with the viewing window frame.

18. A visualizer apparatus comprising: a housing; means defining a film gate in the housing; a plurality of first spools in the housing beyond one end of the film gate; a plurality of second spools in the housing beyond the other end of the film gate; a plurality of film strips within the housing and superimposed on each other within the film gate to form a composite illustration when properly aligned; one end of each film strip being connected to a different first spool and the other end of each film strip being connected to a different second spool, whereby when the first or second spool for a specific film strip is rotated in the proper direction, the first strip will wind around the spool and in so doing will move through the gate, changing the composite illustration, each spool having a pulley spindle extended axially in one direction from it, each spool further having a friction surface located opposite to the friction surface for the spool on which it is located; means for urging the friction surfaces of the spools and drive pulleys apart; an electric motor in the housing; belts connecting the electric motor with the spool pulleys such that when the motor is energized all of the spool pulleys will rotate; and a switch located beyond the pulley spindle of each spool and operated by the pulley spindle such that it will close a circuit between a source of electrical energy and the motor when the spool is moved axially to bring its friction surface against the friction surface of its spool pulley.

19. A visualizer apparatus according to claim 18 wherein each switch comprises a contactor biased toward the end of the pulley spindle for the spool with which it is associated, and a contact normally spaced from the contactor, the spool being movable a sufficient distance axially to bring the contactor against the contact.

20. A visualizer apparatus according to claim 19 wherein the contactors when moved by their respective spools bear against contacts and the contacts are arranged in two groups, the contacts of the one group when any one of them is engaged by its contactors causing the electric motor to revolve in one direction, the contacts of the other group when any one of them is engaged by its contactor causing the electric motor to revolve in the other direction.

21. A visualizer apparatus according to claim 20 wherein each group of contacts is connected with a relay-type switch which in turn is connected to the motor to control the operation of the motor.

22. A visualizer apparatus according to claim 20 wherein the contactors are connected in series when not against their contactors but break the series when moved against their contactors, the endmost contactor in the series being connected to a source of electrical energy, whereby when any one of the contactors is moved against its contact, the series is broken at that contactor and no more than one spool is driven at one time.

23. A visualizer apparatus according to claim 20 and further comprising a separate directional light connected with each group of contacts such that each is energized when any contact within the group to which the light is connected is contacted by its contactor.

24. A visualizer according to claim 18 wherein each spool further comprises an actuating spindle which projects axially from the spool in the direction opposite to that from which the pulley spindle projects.

25. A visualizer according to claim 24 wherein the actuating spindle of each spool has a free end which is exposed externally of the case where an axially directed force may be manually applied to the spool to cause its friction surface to come against the friction surface of the pulley for that spool, and to further cause the pulley spindle to move the switch for the spool to its closed position.

26. A visualizer according to claim 18 and further comprising arcuate guides located in the housing beyond each end of the gate adjacent to some of the spools to prevent film strips which pass by those spools from rubbing against the portions of the film strips wound around those spools.

* * * * *